(12) United States Patent
Conrad et al.

(10) Patent No.: US 12,434,457 B2
(45) Date of Patent: Oct. 7, 2025

(54) WALLBOARD AND METHOD OF MAKING AND USING SAME

(71) Applicants: Hans-Rolf Conrad, Dormagen (DE); Joerg Heinz Hueneke, Krefeld (DE); Lars Malindretos, Krefeld (DE)

(72) Inventors: Hans-Rolf Conrad, Dormagen (DE); Joerg Heinz Hueneke, Krefeld (DE); Lars Malindretos, Krefeld (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 210 days.

(21) Appl. No.: 17/621,164

(22) PCT Filed: Jul. 9, 2020

(86) PCT No.: PCT/EP2020/069446
§ 371 (c)(1),
(2) Date: Jan. 28, 2022

(87) PCT Pub. No.: WO2021/023469
PCT Pub. Date: Feb. 11, 2021

(65) Prior Publication Data
US 2022/0314582 A1     Oct. 6, 2022

(30) Foreign Application Priority Data
Aug. 8, 2019   (DE) .......................... 102019121476.9

(51) Int. Cl.
*B32B 21/13*         (2006.01)
*B27N 3/02*          (2006.01)
(Continued)

(52) U.S. Cl.
CPC ................ *B32B 21/13* (2013.01); *B27N 3/02* (2013.01); *B27N 3/143* (2013.01); *B32B 21/02* (2013.01); *E04C 2/16* (2013.01); *B32B 2607/00* (2013.01)

(58) Field of Classification Search
None
See application file for complete search history.

(56) References Cited

U.S. PATENT DOCUMENTS

| | | | | |
|---|---|---|---|---|
| 3,870,665 | A | * | 3/1975 | Diehr ...................... C08L 97/02 |
| | | | | 524/13 |
| 2004/0103616 | A1 | * | 6/2004 | Herlyn ..................... B32B 7/03 |
| | | | | 52/794.1 |
| 2015/0165735 | A1 | | 6/2015 | Joung |

FOREIGN PATENT DOCUMENTS

| | | | |
|---|---|---|---|
| CA | 2362720 A1 | * | 9/2000 |
| CN | 108162122 A | | 6/2018 |

(Continued)

OTHER PUBLICATIONS

Bitzi, J., Construction Board, Oct. 30, 2007, machine translation of DE102006018277 (Year: 2007).*

*Primary Examiner* — Chinessa T. Golden
(74) *Attorney, Agent, or Firm* — Andrew Wilford (57) ABSTRACT

The invention relates to a material board (1) which comprises a core (2) and a first cover layer (3) and a second cover layer (4), each of which is formed by a mixture (7, 8) formed by lignin-containing particles (5, 6) and binder, which mixture is designed to form a solid body structure in a chemical binding process. The aim is to provide a material panel, which, for ecological and economical reasons, comprises a high proportion of particles based on annual plants and still exhibits good mechanical properties. Another object of the invention can be considered that of ensuring that the system load is kept relatively low during the production (Continued)

process. Another object can be considered that of keeping the proportion of stock removal low. According to the invention, at least 70%, preferably at least 80%, most preferably at least 90% of the particles (5) associated with the mixture (7) of the core (2) are obtained from annual plants, and at least 70%, preferably at least 80%, most preferably at least 90% of the particles (6) associated with the mixtures (8) of the two cover layers (3, 4) are obtained from perennial plants. The invention further relates to the use of a material board and to a method for producing a material board. Finally, the invention relates to a system for producing a material board.

7 Claims, 2 Drawing Sheets

(51) Int. Cl.
*B27N 3/14* (2006.01)
*B32B 21/02* (2006.01)
*E04C 2/16* (2006.01)

(56) References Cited

FOREIGN PATENT DOCUMENTS

| | | | |
|---|---|---|---|
| DE | 102006018277 A | 10/2007 | |
| DE | 102006018277 A1 * | 10/2007 | ............. B32B 21/02 |
| DE | 102015120653 A | 6/2017 | |
| JP | 2002086617 A | 3/2002 | |

* cited by examiner

WALLBOARD AND METHOD OF MAKING AND USING SAME

CROSS REFERENCE TO RELATED APPLICATIONS

This application is the US-national stage of PCT application PCT/EP2020/069446 filed 9 Jul. 2020 and claiming the priority of German patent application 10 2019 121476.9 itself filed 8 Aug. 2020.

FIELD OF THE INVENTION

The invention relates to a wallboard having a core layer and first and second cover layers that are each formed from a mixture of lignin-containing particles and a binder and together into a solid body in a chemical and/or mechanical bonding process.

The invention further relates to a method for making a wallboard that has a core and first and second cover layers that are each formed from a mixture of lignin-containing particles and a binder such that a solid-state structure is formed in a chemical and/or mechanical bonding process under the action of pressure and temperature.

The invention further relates to a use of a wallboard for indoor use in a dwelling.

Finally, the invention relates to a system for making a wallboard, comprising at least one forming station for making a multilayer pressed-material mat on a forming belt and at least one press for pressing the pressed-material mat using pressure and heat to form the wallboard.

BACKGROUND OF THE INVENTION

The production of wallboard takes place either in a batch or continuous manner. In the case of a batch production, the wallboards are produced as flat objects with dimensions that are finite in all three spatial directions, while the wallboards made in a continuous process are cut out of a web having a final dimensions only in two spatial directions. In this case, the operation of the joining and/or compression unit determines whether the overall process is described as a batch or continuous method. Since the compression units, or the combined joining and compression units, are generally also used in making wallboard with appreciable pressures, these units are generally referred to by a person skilled in the art with reference to a total installation as a press. In making wallboards in the prior art, the working pressures are between approximately 50 N/cm$^2$ and approximately 500 N/cm$^2$, depending on the material and size of the wallboard to be produced, and advantageously between 100 N/cm$^2$ and 400 N/cm$^2$ there.

Both in economic terms, such as with regard to their technical use, of wallboard, wood wallboard has a particular point value. Such wallboard is produced in a wide variety of embodiments for different applications. Chip boards, OSB boards and MDF boards are particularly widespread, as well as hybrid boards constructed from individual layers of such composites.

These boards are usually produced from wood particles of different shape and size, the wood particles being bonded together by employing their own adhesion agents and adding adhesives (i.e. glue).

More recently, in addition to the perennial wood materials, annual plants are also sought, in particular grass-like plants for making wallboards. Thus, from the prior art, multilayered wallboards are also known whose individual layers consist of annual plants.

However, the processing of annual plants is significantly more complicated than wallboards based on wood particles. In this way, the high production of abrasive silicates from the manufacturing process is a significant problem.

In addition, the mechanical properties of particles based on particles produced from annual plants also differ in particular from those based on pendants based on wood particles.

Nevertheless, a focus of current developments lies on the provision of wallboards based on annual plants.

A further trend, namely is OSB boards with a chip cover layer that can be easily decorated (paintable or paperable) in dry construction, in particular in residential building construction, DE 10 2015 120 653 proposes a wallboard that has an MDF, span or OSB middle layer that comprises at least one cover layer that is thin with respect to the middle layer and that is formed from straw particles, the particle size of which decreases toward the surface.

The disadvantage of such a board is, above all, that the mechanical properties of the OSB middle layer are reduced by the described cover layer and the manufacturer of such boards must deal with the problems associated with the processing of particles from annual plants even if the amounts to be processed are small due to the small volume of the thin cover layers to be produced.

OBJECTS OF THE INVENTION

Accordingly, an object of the invention is to provide a wallboard that, for ecological and economic reasons, has a high proportion of particles from annual plants and nevertheless has good mechanical properties. A further object of the invention is to ensure that plant problems in the production process are held relatively low. A further object can be considered that of keeping waste to a minimum.

SUMMARY OF THE INVENTION

The object of the invention is attained with regard to a wallboard of the above-mentioned type in that the particles of the mixture of the core are obtained at least 70%, preferably at least 80%, very preferably at least 90%, from annual plants, and that the particles of the mixtures of the two cover layers are obtained at least 70%, preferably at least 80%, very preferably at least 90%, from perennial plants.

A wallboard designed in this way offers great advantages not only from ecological and economic aspects, since the core forming the largest weight and volume fraction is formed from rapidly renewable raw materials that are available worldwide, cost-effectively and without great transport effort, and such a wallboard can also achieve high strength values, in particular high flexural rigidity.

Specifically, the inventors have discovered that the load-bearing capacity of a wallboard, in particular in relation to its bending stiffness, is dependent in a particularly high degree on the design of the outer layers, in particular thus of the cover layers. For this purpose, wallboards whose two outer cover layers are formed from a binder particle mixture, where the particles contained therein are obtained at least 70%, preferably at least 80%, very preferably at least 90%, from perennial plants, even if their core is formed from a binder particle mixture, where the particles contained therein are at least 70%, preferably at least 80%, very preferably at least 90%, from annual plants.

Surprisingly, it has even been found in tests that wallboards where the two outer cover layers are formed from a binder particle mixture and the particles contained therein are obtained at least 30%, preferably at least 50%, very preferably at least 60%, from perennial plants, meet requirements even if their core is formed from a binder particle mixture and the particles contained therein are at least 70%, preferably at least 80%, very preferably at least 90%, from annual plants. Although the increases in the strength values, in particular the bending stiffness values, which can be achieved in this way, compared to a wallboard that is produced exclusively from particles of annual plants, do not indicate the enormous effects that can be achieved in this respect by the above-mentioned particle ratios of at least 70% of a perennial plant component, but such wallboards can also be completely sufficient for many simpler applications.

It is preferred that the first cover layer and the second cover layer form a volume fraction between 15% and 65% of the volume of the wallboard. It is very particularly preferred that the first cover layer and the second cover layer form a volume fraction of between 25% and 50% and in particular a volume fraction of 30% to 45% of the volume of the wallboard.

In the case of such volume fractions, individual cover layer thicknesses of between approximately 1.0 mm and 4.0 mm to 4.5 mm can be formed in conventional wallboard thickness ranges between approximately 8 mm and 25 mm.

In order to be able to realize a volume fraction that is as high as possible by the particles that are preferably to be used for ecological and economic reasons and are obtained from annual plants, it is particularly preferable in the described wallboard strength region that the cover layer thicknesses together form no more than 45% of the volume of the wallboard and in this case in particular form at least 15%, preferably at least 25%, very preferably at least 30%, of the volume of the wallboard.

Furthermore, it is advantageous if there is between the core and at least one cover layer an intermediate layer having a mixture formed from lignin-containing particles and a binder, and the particles of the mixture of the intermediate layer are each obtained at least 5%, preferably at least 10%, very preferably at least 15%, from both annual and perennial plants.

The object of the invention is to provide wallboards that, with the lowest possible weight, offer as high strength values as possible in order, on the one hand, to be easy to handle, for example during manufacture, and on the other hand to meet the necessary mechanical requirements, for example for an appropriate use.

In connection with the discovery of the invention, that the load-bearing capacity of a wallboard, in particular in relation to the flexural rigidity thereof, is dependent in a particularly high degree on the design of the respective outer layers, in particular thus of the cover layers, it can therefore be preferred to form the core from a voluminous nonwoven fabric of low density. Due to their large porosity, such nonwoven fabrics have large notch effects at their boundary layers. Irrespective of how strongly the porosity of the nonwoven forming the core actually is, according to the knowledge of the inventors, for example in the case of thermally induced expansion in the boundary regions between layers that are formed from annual plant fibers (for example a core) and layers that are formed from perennial plant fibers, increased stresses are produced. These stresses then act as a prestress and, as a result of the relatively large distance from the neutral layer, significantly reduce the load-bearing capacity of the wallboard. The above-mentioned notch effect also acts on a sensitive point of the wallboard and likewise has a considerable reduction in the load-bearing capacity of the wallboard. Both negative effects can be significantly reduced by providing a correspondingly designed intermediate layer, so that better properties can be achieved, in particular, higher load-bearing properties of the wallboard.

In order to counteract the effect of thermally induced surface tensions, it is therefore also preferred that the particles of the mixture of a layer, in particular of the core, of a cover layer or of an intermediate layer, are obtained from the plant type derived at least 4%, preferably to at least 8%, very preferably to at least 10%, from the plant whose particles with the large part of the mixture are obtained relative to the layer adjacent thereto.

It is further advantageous if the mixture of the core and the mixtures of the cover layers comprise binders from the same binder group, preferably the same binder.

In this way, the load-bearing capacity of the wallboard can be increased once again. Even if the binder is then not ideally matched to the respective particles, it is preferable that the mixture of the core and the mixtures of the cover layers comprise binders from the same binder group, preferably the same binder. In particular, the wallboard can be prevented from losing load-bearing capacity due to undesired chemical processes.

It can be particularly preferred that the mixture of the core and the mixtures of the cover layers comprise urea resins, in particular isocyanate (pMDI). In this case, it is also preferred that the proportion of binder to solid particles, measured in layers that comprise particles predominantly obtained from annual plants, comprise between 1.5% and 6.5%, in particular between 2% and 5%, and in layers that comprise particles predominantly obtained from perennial plants between 1.5% and 7.5%, in particular between 2% and 6%.

In many cases, it is preferred that the core is an OSB layer.

OSB layers are suitable for contributing particularly high contributions to achieving high flexural rigidity values of wallboards. In the case of a cover layer that comprises particles that are sourced at least predominantly from annual plants, an OSB layer can be formed by a layer of split stalks. The stalks need not necessarily be divided centrally along their longitudinal axis. Instead, it can be sufficient that the stalks are only present in spliced form. The stalks can have lengths between approximately 30 mm and 300 mm, in particular between 60 mm and 200 mm, in particular between 70 mm and 160 mm, as seen in the original longitudinal direction.

In other cases, however, it may be preferred that the core is an MDF or HDF layer.

MDF and in particular HDF layers are also suitable for forming high flexural stiffnesses and also have the advantage that they are suitable as structural material for high-strength and permanently loadable screw connections. Since particles from annual plants can be obtained particularly well by thermal (e.g. cooking) and/or chemical processes, and then also frequently have less aggressive effect on the plant construction necessary in the wallboard production process.

In other cases, however, it is preferred that the core is a chip layer.

Wallboards with cores designed as a chip-layer can be used in a particularly universal manner. In addition, with a coordinated design of the cover layers and/or intermediate layers, a particularly unstressed wallboard can be produced, the stress potential of which counteracts loads acting on the wallboard from outside to a high degree.

Particles obtained from annual plants and formed as chips can preferably have a mesh size between 0.5 mm and approximately 35 mm, in particular between 2 mm and 20 mm, especially between 3 mm and 15 mm.

In many cases, it may be preferred that at least one cover layer is an OSB layer.

As already mentioned, OSB layers are particularly suitable for contributing particularly high contributions to high flexural rigidity values of wallboards.

In the case of a cover layer that comprises particles that are obtained at least predominantly from perennial plants, an OSB layer can be produced by a laid mat of so-called strands or maxistrands that are frequently also called flat or coarse chips. Such strands have an average length of more than 40 mm, preferably more than 80 mm, for example 100 mm to 300 mm or 100 mm to 200 mm, and the specified length variances do not have to appear within a wallboard, but can be present within these limits in narrower tolerances, for example in a range from 125 mm to 160 mm.

The average thickness is more than 0.5 mm, for example 0.6 mm to 1.7, and here too the specified thickness variances do not have to all be present within a single wallboard.

Since the design of the outer cover layers influences the load-bearing capacity of the wallboard to a particular extent, wallboards with particularly high strength values, in particular with particularly high flexural rigidity, can be produced by forming the cover layers as OSB layers.

In other cases, however, it may be preferred that at least one cover layer is an MDF or HDF layer.

Such layers can be processed particularly well. Thus, MDF and HDF layers form particularly clean cut edges in the case of mechanical machining and are also particularly well coated or painted with films due to their smooth surface.

In other cases, however, it is preferred that at least one cover layer is a chip layer.

Wallboards with cover layers designed as a chip layers can be used in a particularly universal manner. In addition, with a coordinated design of the cover layers and/or provided intermediate layers, a particularly low-stress wallboard can be produced whose stress potential counteracts loads acting on the wallboard from the outside to a high degree.

Particles obtained from perennial plants and formed as chips can preferably have a mesh size between 0.5 mm and approximately 20 mm, in particular between 0.5 mm and 10 mm, especially between 0.5 mm and 3.5 mm. It is also true here that the variance of the (mean) lengths within a wallboard need not be all be used.

In many cases, it may also be advantageous if the core and the cover layers surrounding it and optionally intermediate layers are each formed from a uniform layer.

Such wallboards are particularly homogeneous. In addition, they do not require complex upstream equipment in the manufacturing line, since the particles for the different layers can be produced and processed essentially in the same manner. For this reason, such wallboards can be produced economically.

In other cases, on the other hand, it may be of further advantage if the wallboard comprises at least two different layers.

Such wallboards offer the possibilities of providing multilayer custom profiles particularly well. In this case, in particular, the core and the cover layers can be adapted simultaneously in a plurality of degrees of freedom explained above, in particular to the fulfillment of the tasks intended for them.

With regard to the use of a wallboard for residential construction, the object of the invention is achieved in that a wallboard according to the invention related to the wallboard is used.

The resulting advantages can be derived analogously to the advantage description of the wallboard according to the invention and its preferred design possibilities.

With regard to a method of the above-described type, the object of the invention is achieved in that particles are used to form the mixture of the core that are obtained at least 70%, preferably at least 80%, very preferably at least 90%, from annual plants, and in that particles are used to form the mixture of the two cover layers that are obtained at least 70%, preferably at least 80%, very preferably at least 90%, from perennial plants.

With such a method, a wallboard can be produced that offers great advantages not only from ecological and economic aspects, but can also achieve high strength values, in particular high flexural rigidity values. Since the core forming the largest weight and volume fraction is formed from rapidly renewable raw materials that are available worldwide "just in time" and also cost-effectively and without high transport effort, such a method is economically and ecologically very advantageous. Since wallboard can be produced using such a method, the strength values of which, in particular their flexural rigidity, can reach high values, the method is also technologically very advantageous.

Specifically, the inventors have recognized that the load-bearing capacity of a wallboard, in particular in relation to the bending stiffness thereof, is particularly highly dependent on the design of the outer layers, in particular the respective cover layers. For this purpose, a wallboards has two outer cover layers formed from a binder particle mixture where the particles contained therein are obtained at least 70%, preferably at least 80%, very preferably at least 90%, from perennial plants, even if its core is formed from a binder particle mixture where the particles contained therein are obtained at least 70%, preferably at least 80%, very preferably at least 90%, from annual plants.

Surprisingly, it has even been found in tests that wallboards satisfy all requirements whose two outer cover layers are formed from a binder particle mixture where the particles contained therein are obtained at least 30%, preferably at least 50%, very preferably at least 60%, from perennial plants, even if their core is formed from a binder particle mixture where the particles contained therein lead to at least 70%, preferably at least 80%, very preferably at least 90%, from annual plants. Although the increases in the strength values, in particular the bending stiffness values that can be achieved in this way, compared to a wallboard that is produced exclusively from particles of annual plants, there is no indication of the enormous effects which can be achieved in this respect by the above-mentioned particle ratios of at least 70% of a perennial plant component, but such wallboards can also be completely sufficient for many simpler applications.

It is preferred that the first cover layer and the second cover layer have a volume fraction of between 15% and 65% of the volume of the wallboard. It is very particularly preferred that the first cover layer and the second cover layer form a volume fraction of between 25% and 50% and in particular a volume fraction of 30% to 45% of the volume of the wallboard and the layers are bonded to one another.

In the case of such volume fractions, individual cover layer thicknesses of between approximately 1.0 mm and 4.0 mm to 4.5 mm can be formed in conventional wallboard thickness ranges between approximately 8 mm and 25 mm.

In order to be able to realize a volume fraction that is as high as possible by the particles that are preferably to be used for ecological and economic reasons and are obtained from annual plants, it is particularly preferable in the mentioned wallboard strength region that the cover layer thicknesses together do not form more than 45% of the volume of the wallboard and in this case in particular at least 15%, preferably at least 25%, preferably at least 30% of the volume of the wallboard, and the layers are applied uniformly to each other.

In order to counteract the effect of thermally induced surface tensions, it is therefore also preferred that the particles of the mixture of a layer, in particular of the core, of a cover layer, or of an intermediate layer, are obtained from the plant type at least to 4%, preferably to at least 8%, very preferably to at least 10% from which the particles associated with the large part of the mixture of the layer adjacent to it are obtained, and the particles forming the layers are applied to each other beforehand in a correspondingly mixed manner and/or mixing processes are incorporated during the pressing process. Mixing processes can be caused, for example, by targeted heating of one or both sides of the at least not yet completely pressed layers, by shaking and/or by applying targeted pressing profiles and incorporated into the production process of the wallboard.

A possible preferred pressing profile within a continuous production method can consist in the fact that the pressure acting on the core and the two cover layers in the intake end of a continuously operating press is between 35 bar and 50 bar and is pulsed within these limits by a preferably increasing mean value within certain limits before the pressure in the further course of the pressing process is set to a continuous value that preferably drops and can be adjusted to values around the 20 bar before a calibration range of the press. In a calibration region, the pressing pressure can then rise once again to a value of more than 20 bar, for example to up to 25 bar or 30 bar, before the wallboard leaves the pressing region of the wallboard-making plant. During pressing, temperatures of up to 255° C. can act on the cover layers. Preferably, however, the cover layers are not stressed with temperatures of more than 240° C., and the temperature stress can advantageously be set in a sinusoidal manner up to the calibration region, so that the resulting wallboard is subjected only to temperatures of approximately 170° C. to approximately 190° C. before leaving the pressing region.

In this case, it is preferred that, in order to form the solid structure of the wallboard, the mixture forming the core corresponds to that under pressure and the temperature portion of the chemical bonding process is substantially free-flowing, and the mixture forming at least one cover layer is supplied substantially flowable to the portion of the chemical bonding process under pressure and temperature influence.

It is thus provided that, in order to form the core, a mixture of free-flowing particles wetted with binders is poured or strewn, while in order to form at least one cover layer, a mixture of ("floating") particles obtained from perennial plants and contained in a binder-containing solution is applied to a surface layer of the core in fluent form.

This cover layer is thus not produced in a classical manner by a strewing process, but from a fluent, slurry-like particle-liquid mixture or a liquid slurry that constitutes a solid-liquid suspension. Very thin cover layers can thus be produced in a simple manner. During the subsequent compression of the multilayer mat of strewn core layer and wider chip cover layers, the slurry-like cover layer is pressed into the existing cavities or spaces between the particles of the core layer, so that it fills these gaps and flattens the surfaces. As a result of the fact that the material for the cover layers is fluent, a uniform distribution takes place both in the height or thickness of the layer and on the surface. The fluent material thus initially fills open points of the core layer at least over the upper surface and then forms a smooth and closed surface. This can be used particularly advantageously in the case of core layers or middle layers of particularly coarse particles, in particular of strands or (spliced) stalks that are usually in the case of OSB boards particularly rough, open-pored surface. Alternatively, however, the method according to the invention can also be used in core layers made of chips.

This results in a wallboard, in particular a wood wallboard that is distinguished by a smooth and closed surface and can thus be finished directly and easily, for example by applying a coating (paper or thin veneers) or by lacquering or painting. The fact that the bending stiffness of the wallboard, also in its inner transition regions, is only insignificantly impaired is particularly advantageous, since the cover layers and the core layer form very homogeneous transitions due to the liquid application while forming an intermediate layer.

In addition, if this is desired, the cover layers can be applied so thin in the broadest form that the mechanical strength of the core continues to dominate, which can then be designed, for example, as an OSB layer. The use of the fluent material for the cover layers allows the board or the closing of holes and pores (of the core layer) with very small particles, in particular, for example, chips for the cover layers, because the slurry-like particle-liquid mixture contains only a relatively small proportion of solid particles, for example chips, so that only small quantities of particles are required. This makes it possible to make the cover layers so thin that they are designed as non-full-surface cover layers in such a way that (individual) particles, for example strands or spliced stalks, of the core layer partially extend through the cover layer to form interruptions in the cover layer to the surface of the board, so that the particles of the middle layer remain partially or fully visible.

In the course of production, the lower cover pressed-material layer is preferably applied (first) to a (endlessly circulating) forming belt as a fluent chip liquid mixture. The core/pressed-material layer is strewn onto the lower cover pressed-material layer in a conventional manner, for example by one or more suitable strewing devices. The upper cover pressed-material layer is then applied to this strewn core-pressed-material layer as a fluent chip-liquid mixture. Optionally, it is possible to not spread a single one, but a plurality of core-pressed-material layers, that is to say preferably a plurality of layers of strands, stalks or chips with preferably different orientations.

Of particular importance is making the upper pressed-material layers from the fluent particle-liquid mixture in the manner of a suspension that contains, on the one hand, solid particles, for example chips, and on the other hand a liquid, for example water, and also preferably a binder (e.g. glue such as urea resins, in particular isocyanate (pMDI)). It is important that this is a fluent mixture, that is to say the mixture of particles and the liquid (in particular water, but also glue and wax emulsion and other liquid additives) is adjusted in such a way that the resulting viscosity of the mixture is still fluent. The proportion of the liquid in the mixture is more than 100% of the proportion of (dry) chips, based on weight, particularly preferably more than 200%. This means that within the mixture the proportion of liquid is at least as great as the chip portion, preferably at least 2 times (i.e. 200%), particularly preferably at least 3 times (i.e. 300%), in each case based on weight.

The fluent chip-liquid mixture can be applied, for example, by extrusion with an extruder to form the upper pressed-material layers. Alternatively, the mixture can be applied by spray nozzles, rotary spreaders or other suitable devices.

It is of great advantage if, during the chemical bonding process, particles are mixed from the core and the at least one cover layer in such a way that an intermediate layer is formed, the mixture of which comprises particles of annual plants and particles of perennial plants, the proportion of which is at least 5%, preferably at least 10%, very preferably at least 15% in the mixture after completion of the chemical bonding process.

As a result, it is particularly possible to make wallboards that, with the lowest possible weight, offer as high strength values as possible in order, on the one hand, to be easy to handle, for example during manufacture, and on the other hand to meet the necessary mechanical requirements, for example for an appropriate use.

In connection with the discovery of the invention, that the load-bearing capacity of a wallboard, in particular in relation to the flexural rigidity thereof, is dependent in a particularly high degree on the design of the respective outer layers, in particular thus of the respective cover layers, it can therefore be preferred to form the core from a voluminous non-woven fabric of low density, which is in particular mentioned in a so-called press process. It is possible to influence the strewing process particularly well. Due to their large porosity at their boundary layers, however, such non-woven fabrics then have large notch effects. Irrespective of how strongly the porosity of the mat forming the core is actually formed, according to the knowledge of the inventors, for example, in the case of thermally induced expansion in the boundary regions between layers that are formed from annual plant fibers (for example a core) and layers formed from perennial plant fibers to increased stresses. These stresses occur during the production process, but also in the finished wallboard, then act as prestressing and, as a result of the relatively large distance from the neutral layer, significantly reduce the load-bearing capacity of the wallboard. The above-mentioned notch effect also acts on a sensitive point of the wallboard and likewise has a considerable reduction in the load-bearing capacity of the wallboard. Both negative effects can be significantly reduced by the provision of a correspondingly designed intermediate layer, so that better properties can be achieved in particular higher loads on the wallboard.

In order to counteract the effect of thermally induced intersurface tensions, it is therefore also preferred that the particles of the mixture of a layer, in particular of the core, of a cover layer of an intermediate layer, are obtained from the plant type at least to 4%, preferably to at least 8%, very preferably to at least 10%, from which the particles associated with the large part of the mixture of the layer adjacent thereto.

The desired mixing processes can be caused, for example, by targeted heating of one or both sides of the at least not yet completely pressed layers, by shaking and/or by applying targeted pressing profiles and incorporated into the production process of the wallboard. In addition, the strewing preceding the pressing process can be controlled accordingly The invention also relates to a manufacturing method. For example, the formation of particularly porous boundary layers of the core can be programmed and/or, during making the cover layers, first of all a particularly liquid or fluent mixture can be applied to the porous boundary layer of the core.

It can also be preferred that at least the core is fed precompressed to the portion of the chemical bonding process under pressure and temperature.

In this way, both the structure and in particular the density of the core, as well as the nature of its boundary layers, can be influenced. In this case, the boundary layers can be formed differently, for example by the treatment with pressing surfaces of different surface structures. The control of pressure and temperature can also be influenced within certain limits, as the boundary layer closes upon corresponding compression of the core. Depending on the type of layer forming the core, precompression of 1.3:1 to 6.5:1 can be expedient. This can also be dependent on how long the precompressed core has to relax again.

The resulting advantages can be derived analogously to the advantage description of the wallboard according to the invention and its preferred design possibilities.

In relation to a system of the above-described type, at least one object of the invention is achieved in that the forming station has a first applicator for applying at least one free-flowing, core-forming pressed-material mat layer and at least one second applicator for applying at least one fluent, covering layer-forming pressed-material mat layer.

Such an installation is outstandingly suitable for making a wallboard that, for ecological and economic reasons, has a high proportion of annual plants-based particles and nevertheless has good mechanical properties. A further object of the invention can be considered that of designing the plant load in the production process to be relatively low. A further object can be considered that of keeping the cut-off waste portion low.

For this purpose, it can be particularly preferred that the at least one second applicator is an extruder or comprises an extruder, since extruders are suitable for applying fluent particle-liquid mixtures in a process-safe manner, for example, to a section of a circulating forming belt, and the application thereof can be quickly adjusted and, in addition, can be easily metered.

BRIEF DESCRIPTION OF THE DRAWING

The invention is explained in the following with reference to a drawing showing only one embodiment. In the drawing.

SPECIFIC DESCRIPTION OF THE INVENTION

The drawing shows the method according to the invention for making a wallboard, the (wood) wallboard itself, and a system for making same.

Figure 1:
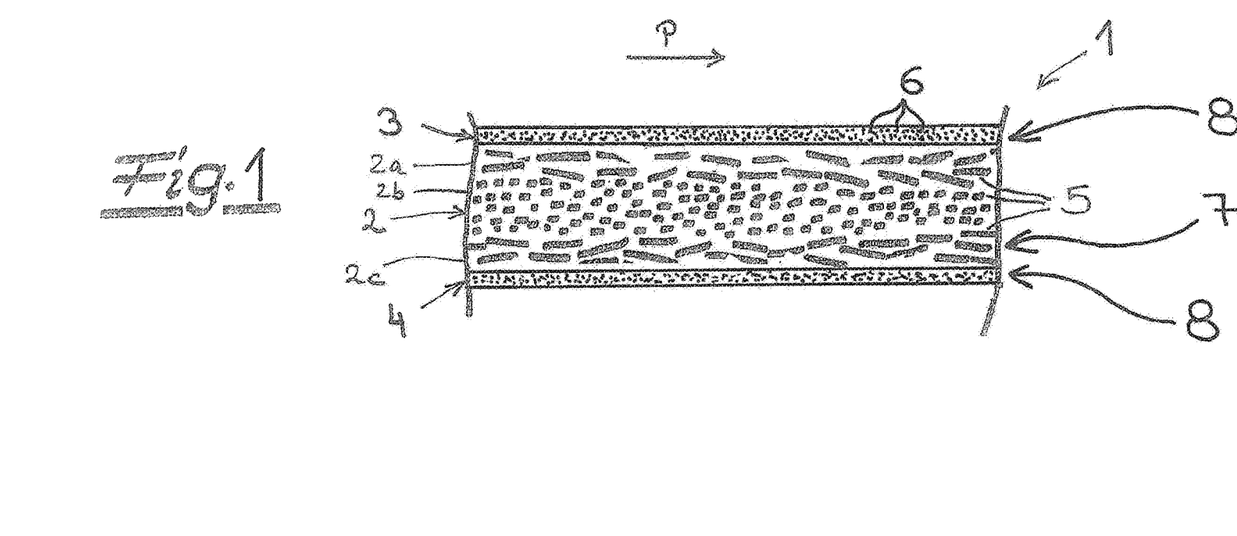
FIG. 1 is a simple vertical section through a wood wallboard according to the invention.

Such (wood) wallboard 1 has a core or core layer 2 and a (e.g. upper) first cover layer 3 and a (e.g. lower) second cover layer 4, and particles 6 in the mixtures 8 forming the two cover layers 3, 4 are obtained at least 70%, preferably at least 80%, very preferably at least 90%, from perennial plants, while particles 5 in the mixture 7 of the core (2) are at least 70%, preferably at least 80%, very preferably at least 90%, from annual plants.

In the embodiment shown, the core layer 2 itself is in turn formed in multiple layers. It has an upper layer 2a, a middle layer 2b, and a lower layer 2c that here each consist of strands, but with different orientations. While the strands of the upper layer 2a and the lower layer 2c extend in the longitudinal production direction X or P, the strands of the middle layer 2b are substantially transverse to the longitudinal production direction X or P of the board and extend in the Y direction. This is merely indicated in simplified form in FIG. 1. However, the core can also be single-layered and/or in the form of another layer, for example as a chip layer or as an MDF/HDF layer.

A multilayer pressed-material mat T that is pressed by means of pressure and heat to form the sheet wallboard 1, is first produced in order to make such a flat wallboard 1.

Such a production method is explained in more detail with reference to FIG. 2. First, a multilayer pressed-material mat T is produced on a forming belt 13, and this pressed-material mat T has a (middle) core pressed-material layer 2', an upper covering pressed-material layer 3' and a lower covering pressed-material layer 4'. This multilayer pressed-material mat T produced on the forming belt 13 is introduced into a press 14 and pressed into the press 14 using pressure and heat to form the wallboard 1. In the illustrated embodiment, the press 14 is a continuously operating dual-belt press 14.

In the prior art, pressed-material mats are generally produced in a classic manner from spreadable, pourable particles in a molding station that contains a plurality of classical strewing heads, so that the individual layers are strewn successively onto the shaping belt 13.

Figure 2:
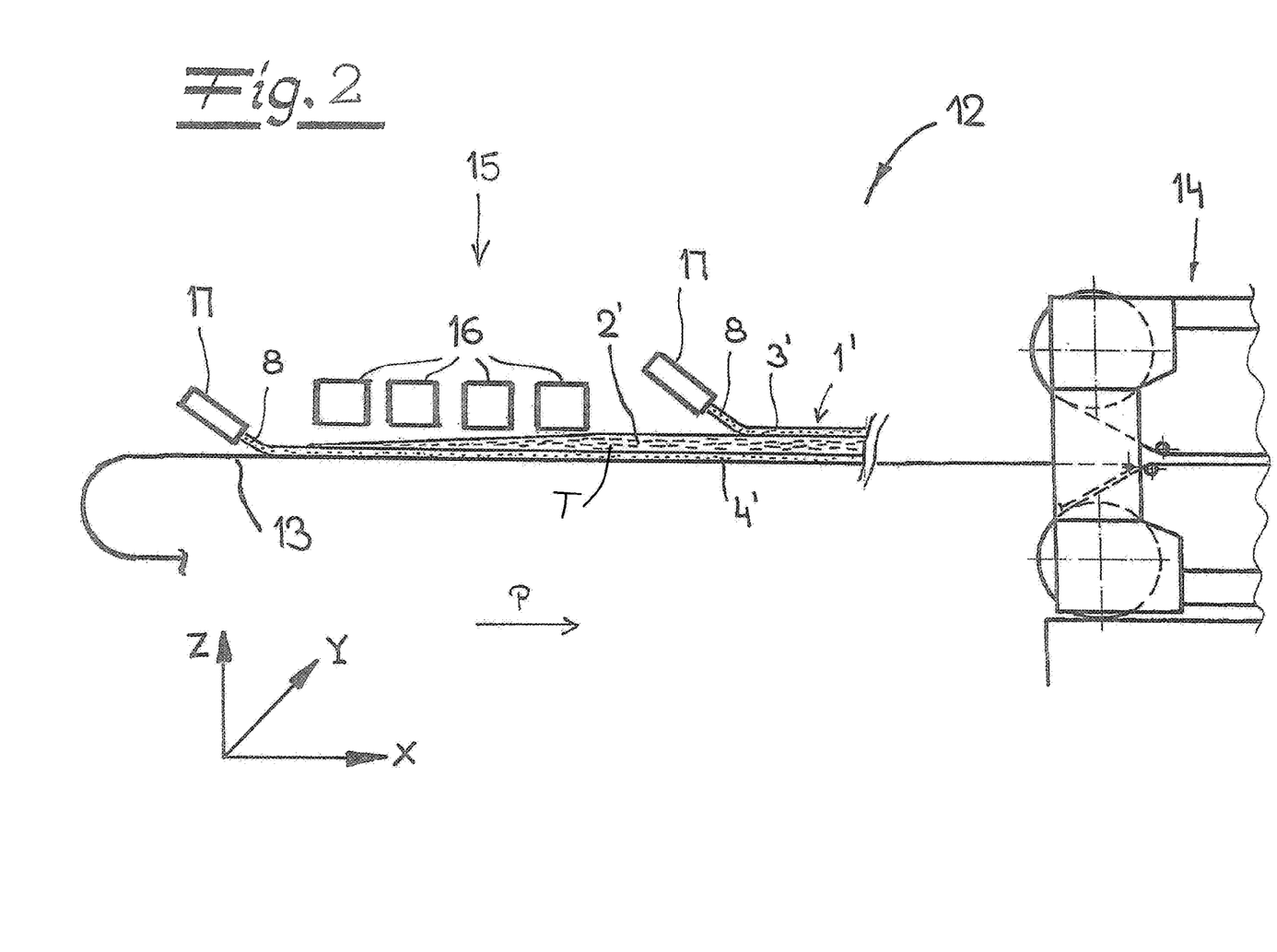
FIG. 2 shows a system according to the invention for making a wallboard.

In contrast, FIG. 2 shows a system that, in a manner according to the invention, does not produce at least one of the cover pressed-material layers 3', 4' from spreadable particles, but rather from a flowable particle-liquid mixture 8. The core-pressed-material layer 2' is strewn in a conventional manner from a mixture of spreadable particles.

For this purpose, the system 12 according to the invention has a forming station 15 that has the first applicators 16 and second applicators 17. While the applicators 16 for the core-pressed-material layer 2' can be designed as classic strewing heads, the applicators 17 for the upper pressed-material layers 3', 4' are designed for application from a flowable chip-liquid mixture 8. They can be, for example, extruders for generating and applying the particle-liquid mixture 8.

In this way, the lower cover pressed-material layer 3' is first extruded onto the forming belt 13 in flowable form. The core-pressed-material layer 2' with the first applicators 16 designed as strewing heads is strewn in a classic manner onto this lower cover pressed-material layer 3'. In this case, in the embodiment according to FIG. 2, a total of four strewing heads are indicated, specifically for making a multilayer correspondingly oriented core pressed-material layer 2'. Thus, the first strewing head strews the longitudinally oriented strands for a lower layer of the core-pressed-material layer 2', the second and third applicator 16 strews the transversely oriented strands for the central position of the core-pressed-material layer 2', and finally the fourth applicator 16 strews the longitudinally oriented strands for the upper layer of the core-pressed-material layer 2'. The last applicator 16 is followed by the applicator 17 for the upper pressed-material layer 4', so that the upper pressed-material layer 4' is extruded onto the core pressed-material layer 2' in flowable form. The pressed-material mat 1' produced in this way is subsequently introduced into the press 14 and pressed into the wallboard 1. Of course, further installation components can be arranged between the forming station 15 and the press 14, for example services for processing the mat, a pre-press and/or preheating device, detection devices for foreign bodies and/or false filling. Details are not shown.

Independent of the system shown in FIG. 2, wallboards according to the invention can have a core 2 and a first cover layer 3 and a second cover layer 4 that are each formed from lignin-containing particles 5, 6 and a mixture 7, 8 formed from lignin, forming a solid body in a chemical bonding process, and the particles 5 of the mixture 7 of the core 2 are at least 70%, preferably at least 80%, very preferably at least 90% are obtained from annual plants, and that the particles 6 of the mixtures 8 of the two cover layers 3, 4 are obtained at least 70%, preferably at least 80%, very preferably at least 90%, from perennial plants, but are also produced on conventional plants, both the core and the cover layers being built up one above the other in the strewing method.

Figure 3:
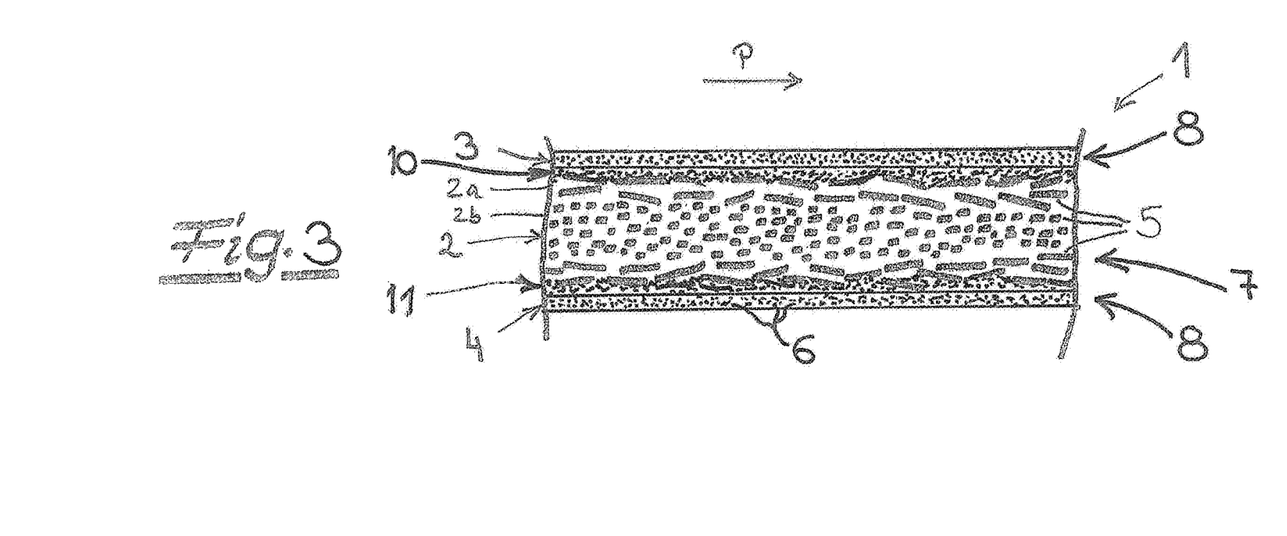
FIG. 3 is another vertical section through a wood wallboard according to the invention.

The system shown in FIG. 2, however, is a particularly good setup for carrying out the method described and consequently also particularly good for making the intermediate layers 10, 11, shown in the wallboard of FIG. 3. The wallboard 1 from FIG. 3 otherwise corresponds in construction to the wallboard shown in FIG. 1.

The invention claimed is:

1. A wallboard comprising:
   an MDF, HDF, or chip core layer of a mixture of fibers at least 70% from annual plants;
   first and second OSB cover layers chemically and/or mechanically bonded to respective opposite faces of the core and each formed of a mixture of binder and lignin-containing particles at least 70% from perennial plants;
   an intermediate layer between the core and one of the layers, having a mixture formed from at least 5% annual—and perennial-plant lignin-containing particles, and serving to reduce interfacial tensions between the core and the one cover layer.

2. A wallboard comprising:
   an MDF, HDF, or chip core layer of a mixture of fibers at least 70% from annual plants; and
   first and second OSB cover layers chemically and/or mechanically bonded to respective opposite faces of the core and each formed of a mixture of binder and lignin-containing particles at least 70% from perennial plants.

3. The wallboard according to claim 2, wherein the mixture of the core and the mixtures of the cover layers comprise binders from the same binder group.

4. The wallboard according to claim 2, wherein the core and the cover layers surrounding it are each formed from a uniform layer.

5. The wallboard according to claim 2, wherein at least two layers different layers is formed of particles different from the other of the two layers.

6. The wallboard according to claim 2, wherein the particles of perennial plants are of wood.

7. A wallboard comprising:
   an MDF, HDF, or chip core layer of a mixture of fibers at least 70% from annual plants and having first and second opposite faces;
   respective first and second OSB cover layers chemically and/or mechanically bonded to the respective opposite faces of the core and each formed of a mixture of binder and lignin-containing particles at least 70% from perennial plants; and
   respective first and second intermediate layers between each of the first and second cover layers and the core layer and each having a mixture formed from at least 5% annual—and perennial-plant lignin-containing particles.

* * * * *